United States Patent
Horio

(10) Patent No.: US 7,751,150 B2
(45) Date of Patent: Jul. 6, 2010

(54) RAMP FOR POLYOXMETHYLENE RESIN HARD DISK DRIVE

(75) Inventor: Mitsuhiro Horio, Kurashiki (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 734 days.

(21) Appl. No.: 11/579,671

(22) PCT Filed: May 30, 2005

(86) PCT No.: PCT/JP2005/009889

§ 371 (c)(1),
(2), (4) Date: Nov. 7, 2006

(87) PCT Pub. No.: WO2005/116137

PCT Pub. Date: Dec. 8, 2005

(65) Prior Publication Data

US 2008/0037175 A1 Feb. 14, 2008

(30) Foreign Application Priority Data

May 31, 2004 (JP) .............................. 2004-160830

(51) Int. Cl.
G11B 21/22 (2006.01)
G11B 5/54 (2006.01)
(52) U.S. Cl. .................................. 360/254.7; 360/255.6
(58) Field of Classification Search ................. 360/254, 360/7, 254.8, 255.6, 255.7
See application file for complete search history.

(56) References Cited

U.S. PATENT DOCUMENTS

| 6,051,169 | A | * | 4/2000 | Brown et al. ................ 264/40.1 |
| --- | --- | --- | --- | --- |
| 6,151,190 | A | | 11/2000 | Yamamoto et al. |
| 6,160,686 | A | | 12/2000 | Albrecht et al. |
| 6,424,501 | B1 | | 6/2002 | Tsujino et al. |
| 6,580,585 | B2 | * | 6/2003 | Feliss et al. ............... 360/254.8 |
| 7,088,555 | B2 | * | 8/2006 | Tsukahara ................ 360/254.8 |
| 7,256,966 | B2 | * | 8/2007 | Horio et al. ............... 360/254.8 |
| 2001/0040769 | A1 | | 11/2001 | Takami |
| 2003/0007293 | A1 | * | 1/2003 | Ng et al. ................... 360/254.8 |
| 2005/0018353 | A1 | | 1/2005 | Tsukahara |
| 2005/0088782 | A1 | | 4/2005 | Horio et al. |
| 2007/0253113 | A1 | * | 11/2007 | Horio et al. ............... 360/254.8 |

FOREIGN PATENT DOCUMENTS

| JP | 9-316255 A | | 12/1997 |
| --- | --- | --- | --- |
| JP | 10-64205 A | | 3/1998 |
| JP | 10-125014 A | | 5/1998 |
| JP | 11-339411 A | | 12/1999 |
| JP | 2000-71241 A | | 3/2000 |
| JP | 2001-23325 A | | 1/2001 |
| JP | 2001-297548 A | | 10/2001 |
| JP | 2002-265681 A | | 9/2002 |
| JP | 2004079109 A | * | 3/2004 |
| WO | WO-03/050186 A1 | | 6/2003 |
| WO | WO-03/055945 A1 | | 7/2003 |

* cited by examiner

*Primary Examiner*—William J Klimowicz
(74) *Attorney, Agent, or Firm*—Birch, Stewart, Kolasch & Birch, LLP

(57) ABSTRACT

A ramp for a polyoxymethylene hard resin disk drive, which has an outgas level of not more than 20 μg/g. The ramp for a polyoxymethylene resin hard disk drive comprises the steps of providing an extruder, melt kneading a polyoxymethylene resin with a colorant while degassing through one or more vents under a reduced pressure of −0.06 Mpa or less to prepare polyoxymethylene resin pellets, and injection molding the polyoxymethylene resin pellets, washing the molding with a solvent, and drying the molding.

9 Claims, No Drawings

RAMP FOR POLYOXMETHYLENE RESIN HARD DISK DRIVE

TECHNICAL FIELD

The present invention relates to a polyoxymethylene resin ramp for a hard disk drive. More specifically, the present invention relates to a ramp for a hard disk drive that takes advantage of the excellent friction wear performance of polyoxymethylene resin and reduces the outgas level and the harmful component amount.

BACKGROUND ART

Polyoxymethylene resin is used in wide applications including various structural parts and office automation equipment, as an engineering resin having well-balanced mechanical properties and excellent friction wear performance. Recently, attempts have been made to use such polyoxymethylene resin as material for a ramp in a hard disk drive. For example, Patent Documents 1 and 2 disclose that synthetic resins such as polyoxymethylene are suitable as ramp materials. Patent Document 3 also describes as ramp materials a copolyester (HAHN) between 4-hydroxybenzoic acid and 6-hydroxy-2-naphthoic acid, polyoxymethylene, and polyetheretherketone. Patent Document 4 describes, as ramp unit materials, polyimide, polyoxymethylene, PEEK, HAHN, liquid crystal polymers and PTFE-filled plastics. Patent Document 5 discloses an application of a material having a tensile elongation of 30% or more as a ramp material, specifically, a polyoxymethylene resin. Patent Document 6 submitted by the applicants of the present application discloses a ramp for a hard disk formed of a polyoxymethylene resin and a polymer lubricant material.

On other hand, for sealing materials and gasket materials to be used in hard disk devices, as described in Patent Documents 7 and 8, there have been demanded materials low in generation of outgases (corroding gases such as sulfur, bromine and chlorine; and organic gases such as siloxane and olefin) in order to avoid staining of a magnetic or optical disk set in a device. The proportion of the amount of a ramp material to that of a sealing material is from a few tenths to a few hundredths in terms of weight ratio; however, from the viewpoints of the size reduction and high integration of HDD, demand for materials low in outgas and corroding gas generation is conceivably essential.

However, in the aforementioned conventional technologies, no description on the outgases and corroding gases (harmful gases) is found and further, no proposal that considers and attempts to reduce the adverse effect due to the colorant in a polyoxymethylene resin ramp is found.

Patent Document 1: JP-A-10-064205 (U.S. Pat. No. 6,151,190A)
Patent Document 2: JP-A-10-125014 (without family)
Patent Document 3: JP-A-11-339411 (U.S. Pat. No. 6,160,686A)
Patent Document 4: JP-A-2001-23325 (U.S. Pat. No. 6,424,501B1)
Patent Document 5: JP-A-2001-297548 (US2001/0040769A1)
Patent Document 6: WO03-055945
Patent Document 7: JP-A-09-316255 (without family)
Patent Document 8: JP-A-2002-265681 (without family)
Patent Document 9: JP-A-2000-71241 (without family)

DISCLOSURE OF THE INVENTION

The present invention has been achieved under the aforementioned circumstances, and takes as its object the reduction of an outgas level and an amount of a harmful component in a ramp made of a polyoxymethylene resin for a hard disk drive.

The present inventors have conducted various studies for the purpose of reducing the outgas level and the amount of a harmful component in a ramp made of a polyoxymethylene resin containing a colorant, and have found that the object can be achieved through carrying out the following processing methods. As a result, they have completed the present invention.

Specifically, the present invention includes the following aspects:

(1) A ramp for a hard disk drive, the ramp including a polyoxymethylene resin and a colorant and having an outgas level of 20 µg/g or less.

(2) A ramp for a hard disk drive having an outgas level of 20 µg/g or less, the ramp being produced by the steps: forming a polyoxymethylene resin pellet by melt-kneading a polyoxymethylene resin with a colorant using an extruder while degassing under a reduced pressure of −0.06 MPa or less from one or more vents of the extruder; injection molding the formed polyoxymethylene resin pellet; solvent washing the molded article; and drying the washed molded article.

(3) The ramp for a hard disk drive according to the above item (2), wherein the colorant is at least one member selected from the group consisting of titanium oxide, a composite metal oxide, iron oxide, carbon black, calcium carbonate, wollastonite and ultrafine particles of carbon.

(4) The ramp for a hard disk drive according to the above item (2) or (3), wherein the extruder is a twin screw extruder.

(5) The ramp for a hard disk drive according to any one of the above items (2) to (4), wherein the amount of the chloride ion adhering to the surface of the polyacetal resin obtained by the melt-kneading step is 1 µg/g or less.

(6) The ramp for a hard disk drive according to the above item (5), wherein the amount of the chloride ion adhering to the surface of the resin is 0.5 µg/g or less.

(7) The ramp for a hard disk drive according to any one of the above items (1) to (6), the ramp having an outgas level of 15 µg/g or less.

(8) The ramp for a hard disk drive according to any one of the above items (1) to (6), the ramp having an outgas level of 10 µg/g or less.

(9) The ramp for a hard disk drive according to any one of the above items (1) to (6), the ramp having an outgas level of 5 µg/g or less.

(10) The ramp for a hard disk drive according to any one of the above items (2) to (9), the ramp being produced by using a colorant having a small content of a harmful component in the melt-kneading step and the ramp having the harmful component in an amount of 0.3 µg/g or less.

(11) The ramp for a hard disk drive according to the above item (10), the ramp having the harmful component in an amount of 0.1 µg/g or less.

(12) The ramp for a hard disk drive according to the above item (10), the ramp having the harmful component in an amount of 0.05 µg/g or less.

(13) A method for producing a ramp for a hard disk drive having an outgas level of 20 µg/g or less, the method comprising the steps of: forming a polyoxymethylene resin pellet by melt-kneading a polyoxymethylene resin with a colorant using an extruder while degassing under a reduced pressure of −0.06 MPa or less from one or more vents of the extruder;

injection molding the formed polyoxymethylene resin pellet; solvent washing the molded article; and drying the washed molded article.

BEST MODE FOR CARRYING OUT THE INVENTION

Specific description will be made below on the present invention.

The polyoxymethylene resin to be used in the present invention is at least one selected from the following group: homopolymers obtained by polymerizing formaldehyde, or cyclic oligomers of formaldehyde such as trioxane (i.e., a trimer of formaldehyde) or tetraoxane (i.e., a tetramer of formaldehyde) and by blocking each of both ends of the polymers with an ether or ester group; oxymethylene copolymers each of which contains, in a proportion of 0.1 to 20 mol % relative to oxymethylene an oxyalkylene unit having 2 to 8 carbon atoms obtained by copolymerizing formaldehyde, trioxane (i.e., a trimer of formaldehyde) or tetraoxane (i.e., a tetramer of formaldehyde) with ethylene oxide, propylene oxide, 1,3-dioxolane, formal of glycol, formal of diglycol or the like; such polymers further having branched molecular chains; and oxymethylene block polymers each of which contains 50% by weight or more of segments each of which is formed of oxymethylene units and 50% by weight or less of other segments. Preferable as an oxymethylene block polymer are a block polymer of a polyalkylene glycol and a polyoxymethylene homopolymer disclosed in JP-A-57-31918 and a block polymer of a hydrogenated polybutadiene and an oxymethylene copolymer disclosed in Japanese Patent Application No. 11-216654.

These polyoxymethylene resins can be selectively used so as to be suitable for the purposes. From the viewpoints of the slidability and rigidity, preferable is the use of a homopolymer or a copolymer small in comonomer amount. From the viewpoints of the thermal stability and impact resistance, preferable is the use of a copolymer large in comonomer amount, or a block polymer of a hydrogenated polybutadiene and an oxymethylene copolymer. For the intended purpose of the present invention, most preferable is a copolymer small in comonomer amount from the viewpoint of the balance between the slidability and the thermal stability. The melt flow rate (measured under the conditions specified by ASTM-D1238-57T) of the polyoxymethylene resin to be used in the present invention falls in a range from 0.5 g/10 min to 100 g/10 min, preferably from 1.0 g/10 min to 80 g/10 min, more preferably from 5 g/10 min to 60 g/10 min, and most preferably from 7 g/10 min to 50 g/10 min. When the melt flow rate is 0.5 g/10 min or more, the molding workability is excellent and when the melt flow rate is less than 100 g/10 min, the durability is sufficient.

In the polyoxymethylene resin of the present invention, stabilizers used in conventional polyoxymethylene resins such as a thermal stabilizer and a weather resistance stabilizer (photostabilizer) can be used each alone or in combinations thereof. Specifically, those stabilizers described in WO01-032775 can be used.

A preferable combination of the stabilizers for the polyoxymethylene resin of the present invention is a combination of a "hindered phenol (in particular, triethylene glycol-bis-(3-(3-t-butyl-5-methyl-4-hydroxyphenyl)-propionate), or tetrakis-(methylene-3-(3',5'-di-t-butyl-4'-hydroxyphenyl) propionate methane))," a "formaldehyde reactive nitrogen-containing polymer (in particular, polyamide resin, or poly-β-alanine)," and if needed, a "fatty acid salt of an alkaline earth metal (in particular, a fatty acid salt of calcium)." The addition amounts of the combined stabilizers are as follows: a range from 0.05 to 0.5% by weight for a "hindered phenol"; a range from 0.01 to 0.5% by weight for a "formaldehyde reactive nitrogen-containing polymer"; and if needed, a range from 0.01 to 0.5% by weight for a "fatty acid salt of an alkaline earth metal (in particular, a fatty acid salt of calcium)," relative to the polyoxymethylene resin.

The colorant to be used in the present invention is at least one selected from organic and inorganic pigments and/or dyes. As inorganic pigments, generally used inorganic pigments may be used; examples of such pigments include zinc oxide, titanium oxide, composite oxides of metals (two or more selected from Ti, Cr, Sb, Ni, Zn, Fe, Co, Al and Cu) typified by titanium yellow, iron oxide, ultramarine blue, cobalt blue, calcined pigments, carbon black, acetylene black and lamp black.

The purpose of using a colorant in a ramp for a hard disk drive is to facilitate the dimensional measurement with laser light. For this purpose, particulate inorganic fillers are included in the aforementioned inorganic pigments. Examples of such fillers include silica, quartz powder, aluminum silicate, kaolin, talc, clay, diatom earth, nepheline syenite, cristobalite, wollastonite (calcium silicate), alumina, calcium sulfate, barium sulfate, calcium carbonate, magnesium carbonate, dolomite, calcium phosphate, hydroxyapatite, mica, ultrafine particle carbons such as conductive carbon black and carbon nanotubes, and powders of various metals. These inorganic pigments and fillers are commonly used with a particle size of 10 μm or less; the particle size is preferably 5 μm or less, more preferably 3 μm or less, and furthermore preferably 1 μm or less. These inorganic pigments and particulate inorganic fillers may be treated with a dispersant or a surface treatment agent within an extent that does not affect the ramp for a hard disk drive of the present invention.

Examples of the organic pigments include monoazo pigments, condensed azo pigments, phthalocyanine pigments, anthraquinone pigments, perynone pigments, quinacridone pigments, dioxazine pigments, quinaphthalone pigments and isoindoline pigments.

Preferred among these are titanium oxide, composite oxides of metals, iron oxide, carbon black, calcium carbonate, wollastonite and ultrafine particles of carbon.

The harmful substances in the colorant of the present invention are substances that cause corrosion and contact failure in a hard disk drive such as halogens, halogen-containing aliphatic/aromatic compounds, siloxane, silicone compounds, sulfur compounds, phthalic acid and phthalates, acrylic acid and acrylates, phosphoric acids and organotin compounds. An outgas as referred to in the present invention means a volatile component containing one of the aforementioned harmful substances; examples of components other than the harmful substances include aliphatic/aromatic hydrocarbons; oxygen-containing compounds such as alcohols, ethers and esters; and formaldehyde and the cyclic compounds thereof. These outgases other than the harmful substances cause adhesion-related failure through condensation in the head-disk interface space or diffusion over the disk surface.

Usable in the polyoxymethylene resin of the present invention are: the polyolefin resin disclosed in WO03-055945; a polymer obtained by polymerization of a polyether and an isocyanate compound; a block copolymer between a polyether and an olefin disclosed in Japanese Patent Application No. 2004-244024; various inorganic fillers, lubricants; and additionally, various additives usually used in polyoxymethylene resins such as lubricant other than the aforementioned lubricants, impact resistance improvers, other resins, crystal nucleation agents and mold-releasing agents.

The hard disk ramp of the present invention can be obtained by processing the aforementioned polyoxymethylene resin with the following processing method.

A polyoxymethylene resin low in outgas level is obtained by degassing under a reduced pressure from one or more vents when melt-kneaded by using a vent-equipped extruder, preferably by using a twin screw extruder. For the purpose of efficiently degassing with two or more vents provided, the L/D of the extruder is preferably approximately 25 to 50, and more preferably 30 to 50. The pressure reduction degree is required to be −0.06 MPa or less, preferably −0.07 MPa or less, more preferably −0.08 MPa and particularly preferably −0.09 MPa or less.

The outgas level of the polyoxymethylene resin of the present invention can be further reduced by making chloride ion adhering to the surface of the resin have an amount of 0.5 µg/g or less; the amount is more preferably 0.3 µg/g or less and particularly preferably 0.1 µg/g or less. The purpose of such reduction of this amount resides in the utmost prevention of the outgas generation ascribable to the decomposition of the polyoxymethylene resin caused by chloride ion under heating operation. No particular constraint is imposed on the method for reducing chloride ion adhering to the surface; however, examples of such a method include: a method in which a step for removing the adhering water by air blowing or suction is added in the step for cooling the melt-extruded resin; and a method in which an amount of chloride ion itself contained in the cooling water is reduced by ion exchange or the like. JP-A-2000-71241 has proposed the improvement of a thermal stability attained by reducing an amount of chloride ion contained in the cooling water, in which improvement no interrelation between the chloride ion and the outgas in a colorant-containing system is disclosed.

Preliminary reduction of the outgas level as described above and the use of pellets having a reduced amount of chloride ion yield a ramp for a hard disk low in outgas level by carrying out the successive steps for pellet drying, injection molding of pellets, and solvent washing and drying of the molded article. The outgas level of the ramp is 20 µg/g or less, more preferably 15 µg/g or less, furthermore preferably 10 µg/g or less, and particularly preferably 5 µg/g or less.

As a method for reducing an amount of a harmful substance contained in an outgas from a ramp made of a polyoxymethylene resin for a hard disk drive, it is important to reduce an amount of a harmful substance in the colorant to the lowest possible level. Examples of the method for reducing the amount of the harmful substance in the colorant include: a method wherein a raw material that contains no harmful substance is used; and a method wherein the harmful substance can be removed or reduced by incorporating a high temperature treatment into the preparation process of the colorant. In this sense, preferable are inorganic pigments that are allowed to be treated at high temperatures. The reduction of the amount of the harmful substance in the colorant enables the reduction of the amount of the harmful substance contained in the ramp as a product. The amount of the harmful substance in the ramp for a hard disk drive is preferably 0.3 µg/g or less, more preferably 0.1 µg/g or less and particularly preferably 0.05 µg/g or less.

The extrusion processing of the polyoxymethylene resin pellets in the present invention is conducted by using a single screw extruder or a twin screw extruder, and by degassing from one or more vents under a reduced pressure. The processing temperature desirably falls within a range from 180 to 240° C., preferably from 180 to 220° C., and particularly preferably from 190 to 210° C. Replacement of the atmosphere with an inert gas is also preferable for the purpose of maintaining the product quality and the work environment.

EXAMPLES

The present is further explained below with reference to specific examples. At the beginning, the components and the evaluation methods to be used in Examples and Comparative Examples will be described below.

(Components)

A. Polyoxymethylene Resin

A biaxial paddle type continuous polymerizer with a jacket through which a heating medium was allowed to pass was regulated to be set at 80° C., and water and trioxane-containing 4 ppm of formic acid were fed to the polymerizer at a rate of 40 mol/hr. At the same time, as a cyclic formal, 1,3-dioxolane was fed to the polymerizer at a rate of 0.65 mol/hr. Polymerization was carried out by continuously feeding boron trifluoride di-n-butyl etherate dissolved in cyclohexene, as the polymerization catalyst, in an amount of $5 \times 10^{-5}$ mole relative to 1 mole of trioxane and methylal ($(CH_3O)_2CH_2$) as a chain transfer agent in an amount of $2 \times 10^{-3}$ mole relative to 1 mole of trioxane. The polymer discharged from the polymerizer was put into a 1% aqueous solution of triethylamine to completely deactivate the polymerization catalyst. Thereafter, the polymer was filtered out, washed, homogeneously mixed, and then dried at 120° C. to yield a crude polyoxymethylene copolymer.

Next, a 30 mm twin screw extruder with a side feed opening and a liquid addition line (set at a temperature of 200° C.) was used, and 100 parts by weight of the aforementioned dried crude polyoxymethylene copolymer was fed through the main feed opening into the extruder. To the molten polyoxymethylene copolymer, a 2% by weight aqueous solution of triethylamine was fed in a proportion of 5 parts by weight to decompose the unstable terminal portions. Then, degassing was carried out from a vent disposed at a downstream position under a reduced pressure of −0.07 MPa. Further, from the side feed opening disposed at a position further downstream of the vent, 0.3 parts by weight of triethylene glycol-bis[3-(3-t-butyl-5-methyl-4-hydroxyphenyl)propionate] as an antioxidant, 0.05 parts by weight of calcium stearate and 0.025 parts by weight of polyamide 66 were added, and melt-kneading was carried out. The polyoxymethylene copolymer was extruded as strands from the dice of the extruder, the strands were cooled with ion-exchanged water (the concentration of the contained chloride ion: 0.1 µg/g or less) and then palletized. The thus obtained polyoxymethylene copolymer included 0.51 mol% (relative to the oxymethylene unit) of the comonomer and the melt flow rate was 29 g/10 min. The pellets were dried at 80° C. for 3 hours by using a hot air dryer and thus treated pellets gave an outgas level of 50 µg/g, an amount of adhering chloride ion of 0.1 µg/g or less, and an amount of the harmful component (polydimethylsiloxane (D4 to D10)) of 0.001 µg/g or less (these values are respectively measured with the methods described below). Needless to say, the harmful components being of interest to the present invention is not limited to polydimethylsiloxane (D4 to D10); however, for the sake of simplicity, the harmful component to be measured is limited to polydimethylsiloxane.

B. Colorants

B1: Titanium oxide containing a harmful component (polydimethylsiloxane (D4 to D10)) in an amount of 0.001 µg/g or less B2: Titanium oxide containing a harmful component (polydimethylsiloxane (D4 to D10)) in an amount of 5 µg/g B3: Titanium oxide containing a harmful component (polydimethylsiloxane (D4 to D10)) in an amount of 25 µg/g B4: Titanium oxide containing a harmful component (polydimethylsiloxane (D4 to D10)) in an amount of 50 µg/g (Evaluation Methods)

(1) Outgas Test

Outgas level: The GC-MS method was applied; 1.0 g of a sample was heated in helium gas to 90° C., purged with helium gas at 50 ml/min, and the generated gas was adsorbed to an adsorption tube for 180 minutes. Then, the adsorption tube was set in a GC-MS (GC-5890+MSD-5972A, made by Hewlett-Packard Co.), desorption was carried out, and the outgas level was subjected to measurement by using a non-polar column with hexadecane as reference substance.

1) Amount of harmful component in the outgas: The aforementioned harmful component (polydimethylsiloxane (D4 to D10)) in the outgas was identified, and the amount thereof was measured (as an amount (µg) per 1.0 g of the sample; in unit of µg/g).

2) Total outgas level: under the conditions that the retention times (in minute) for toluene, tetradecane, octadecane, hexadecanoic acid and ethyl ester as the contained components were 3.99, 12.45, 16.35, 18.00 and 18.00, respectively, the components detected within 25 minutes were identified to constitute the total outgas level (as an amount (µg) per 1.0 g of the sample; in unit of µg/g).

(2) Chloride ion Adhering to Pellets

From 10 g of polyacetal resin pellets, chloride ion was extracted at 23° C. for 5 minutes by using 10 g of purified water. The supernatant liquid of the extract was subjected to the measurement of the amount of chloride ion by using an ion chromatograph (DX-500, made by Dionex Corp.) (as an amount (µg) per 1.0 g of pellets; in unit of µg/g).

(3) Molding and Washing of a Ramp

Polyoxymethylene resin pellets were dried at 100° C. for 3 hours by using a hot air dryer. Then, by using an injection molding machine having an injection capacity of 5 ounces, a 15×6×5 mm ramp weighing 0.4 g was molded under the conditions that the cylinder temperature and the die temperature were set at 200° C. and 100° C., respectively, and the injection time and the cooling time were set at 20 seconds and 10 seconds, respectively. Then the ramp was subjected to successive ultrasonic cleaning steps each during 20 minutes by using four ultrasonic cleaners (the first cleaner contained 5% of a surfactant (Elease 1000 (trademark), manufactured by Asahi Kasei Chemicals Corp.), and the second to fourth cleaners contained purified water). After washing, the ramp was dried at 80° C. for 20 hours with a hot air dryer.

Example 1

By using a blender, 100 parts by weight of polyoxymethylene resin (A), 1 part by weight of the colorant (B1) and 0.05 parts by weight of liquid paraffin as a dispersing agent were mixed together, and the obtained mixture was extrusion-kneaded by using a 55 mm φ single screw extruder having one vent opening, at a cylinder temperature of 200° C., at a screw rotation rate of 100 rpm, at a discharge rate of 50 kg/hr and at a vent pressure reduction degree of 0.07 MPa. The extruded resin was cooled by using tap water (containing 50 µg/g of chloride ion) and turned into pellets by using a strand cutter, and the pellets were dried for 5 hours with a hot air dryer set at 80° C. The obtained pellets were found to give an outgas level of 40 µg/g and the amount of adhering chloride ion of 0.7 µg/g. A ramp was molded by using the pellets, and the obtained ramp was washed and dried, for which ramp the outgas level and the amount of the harmful substance were measured. The results obtained are shown in Table 1.

Example 2

The operation was carried out in the same manner as in Example 1, except that the extruded resin was cooled with tap water (containing 50 µg/g of chloride ion), then the moisture was suction-removed by passing through a moisture removing apparatus and the resin was turned into pellets with a strand cutter. The obtained pellets were found to give the outgas level of 23 µg/g and the amount of adhering chloride ion of 0.3 µg/g. A ramp was molded by using the pellets, and the obtained ramp was washed and dried, for which ramp the outgas level and the amount of the harmful substance were measured. The results obtained are shown in Table 1.

Example 3

By using a blender, 100 parts by weight of polyoxymethylene resin (A), 1 part by weight of the colorant (B1) and 0.05 parts by weight of liquid paraffin as a dispersing agent were mixed together, and the obtained mixture was extrusion-kneaded by using a 58 mm φ twin screw extruder having one vent opening, at a cylinder temperature of 200° C., at a screw rotation rate of 100 rpm, at a discharge rate of 150 kg/hr and at a vent pressure reduction degree of 0.07 MPa. The extruded resin was cooled by using tap water (containing 50 µg/g of chloride ion) and turned into pellets by using a strand cutter, and the pellets were dried for 5 hours with a hot air dryer set at 80° C. The obtained pellets were found to give the outgas level of 15 µg/g and the amount of adhering chloride ion of 0.7 µg/g. A ramp was molded by using the pellets, and the obtained ramp was washed and dried, for which ramp the outgas level and the amount of harmful substance were measured. The results obtained are shown in Table 1.

Example 4

The operation was carried out in the same manner as in Example 3, except that the extruded resin was cooled with tap water (containing 50 µg/g of chloride ion), then the moisture was suction-removed by passing through a moisture removing apparatus and the resin was turned into pellets with a strand cutter. The obtained pellets were found to give the outgas level of 10 µg/g and the amount of adhering chloride ion of 0.3 µg/g. A ramp was molded by using the pellets, and the obtained ramp was washed and dried, for which ramp the outgas level and the amount of harmful substance were measured. The results obtained are shown in Table 1.

Example 5

The operation was carried out in the same manner as in Example 4, except that an additional vent opening was added to the twin screw extruder used in Example 4 so as to have two vent openings and degassing was carried out under the same conditions as in Example 4. The obtained pellets were found to give the outgas level of 7 µg/g and the amount of adhering chloride ion of 0.3 µg/g. The results obtained are shown in Table 1.

Example 6

The operation was carried out in the same manner as in Example 4, except that the colorant (B1) in Example 4 was replaced with the colorant (B2). The obtained pellets were found to give the outgas level of 10 µg/g and the amount of adhering chloride ion of. 0.3 µg/g. The results obtained are shown in Table 1.

Example 7

The operation was carried out in the same manner as in Example 4, except that the colorant (B2) in Example 6 was replaced with the colorant (B3). The obtained pellets were found to give the outgas level of 11 µg/g and the amount of adhering chloride ion of 0.3 µg/g. The results obtained are shown in Table 1.

Example 8

The operation was carried out in the same manner as in Example 4, except that the colorant (B3) in Example 7 was replaced with the colorant (B4). The obtained pellets were found to give the outgas level of 12 µg/g and the amount of adhering chloride ion of 0.3 µg/g. The results obtained are shown in Table 1.

Comparative Example 1

By using a blender, 100 parts by weight of polyoxymethylene resin (A) and 0.05 parts by weight of liquid paraffin as a dispersing agent were mixed together, and the obtained mixture was extrusion-kneaded by using a 55 mm φ single screw extruder having one vent opening, at a cylinder temperature of 200° C., at a screw rotation rate of 100 rpm, at a discharge rate of 50 kg/hr and with no vent pressure reduction. The extruded resin was cooled by using tap water (containing 50 µg/g of chloride ion) and turned into pellets by using a strand cutter, and the pellets were dried for 5 hours with a hot air dryer set at 80° C. The obtained pellets were found to give the outgas level of 55 µg/g and the amount of adhering chloride ion of 0.6 µg/g. A ramp was molded by using the pellets, and the obtained ramp was washed and dried, for which ramp the outgas level and the amount of the harmful substance were measured. The results obtained are shown in Table 1.

Comparative Example 2

The operation was carried out in the same manner as in Comparative Example 1 except that the vent pressure reduction degree was set at 0.07 MPa. The obtained pellets were found to give the outgas amount of 30 µg/g and the amount of adhering chloride ion of 0.6 µg/g. A ramp was molded by using the pellets, and the obtained ramp was washed and dried, for which ramp the outgas level and the amount of the harmful substance were measured. The results obtained are shown in Table 1.

Comparative Example 3

By using a blender, 100 parts by weight of polyoxymethylene resin (A), 1 part by weight of the colorant (B1) and 0.05 parts by weight of liquid paraffin as a dispersing agent were mixed together, and the obtained mixture was extrusion-kneaded by using a 55 mm φ single screw extruder having one vent opening, at a cylinder temperature of 200° C., at a screw rotation rate of 100 rpm, at a discharge rate of 50 kg/hr and with no vent pressure reduction. The extruded resin was cooled by using tap water (containing 50 µg/g of chloride ion) and turned into pellets by using a strand cutter, and the pellets were dried for 5 hours with a hot air dryer set at 80° C. The obtained pellets were found to give the outgas level of 70 µg/g and the amount of adhering chloride ion of 0.7 µg/g. A ramp was molded by using the pellets, and the obtained ramp was washed and dried, for which ramp the outgas level and the amount of the harmful substance were measured. The results obtained are shown in Table 1.

Comparative Example 4

The operation was carried out in the same manner as in Comparative Example 2 except that the tap water used for cooling in Comparative example 2 was replaced with water containing chloride ion in an amount of 150 µg/g. The obtained pellets were found to give the outgas level of 60 µg/g and the amount of adhering chloride ion of 1.3 µg/g. The results obtained are shown in Table 1.

Comparative Example 5

The operation was carried out in the same manner as in Comparative Example 3 except that the tap water used for cooling in Comparative example 3 was replaced with water containing chloride ion in an amount of 150 µg/g. The obtained pellets were found to give the outgas level of 85 µg/g and the amount of adhering chloride ion of 1.3 µg/g. The results obtained are shown in Table 1.

TABLE 1-1

| | | Example 1 | Example 2 | Example 3 | Example 4 | Example 5 | Example 6 | Example 7 | Example 8 |
|---|---|---|---|---|---|---|---|---|---|
| Composition (parts by weight) | Polyacetal resin A | 100 | 100 | 100 | 100 | 100 | 100 | 100 | 100 |
| | Colorant B1 | 1 | 1 | 1 | 1 | 1 | — | — | — |
| | Colorant B2 | — | — | — | — | — | 1 | — | — |
| | Colorant B3 | — | — | — | — | — | — | 1 | — |
| | Colorant B4 | — | — | — | — | — | — | — | 1 |
| Preparation conditions | Extruder | Single screw | Single screw | Twin screw | Twin screw | Twin screw | Twin screw | Twin screw | Twin screw |
| | Vent(s) | Single | Single | Single | Single | Double | Single | Single | Single |
| | Chloride ion concentration in cooling water (µg/g) | 50 | 50 | 50 | 50 | 50 | 50 | 50 | 50 |
| | Suction removal of water adhering to strands | Not applied | Applied | Not applied | Applied | Applied | Applied | Applied | Applied |
| | Outgas from pellets (µg/g) | 40 | 23 | 15 | 10 | 7 | 10 | 11 | 12 |

TABLE 1-1-continued

|  |  | Example 1 | Example 2 | Example 3 | Example 4 | Example 5 | Example 6 | Example 7 | Example 8 |
|---|---|---|---|---|---|---|---|---|---|
|  | Chloride ion adhering to pellets (µg/g) | 0.7 | 0.3 | 0.7 | 0.3 | 0.3 | 0.3 | 0.3 | 0.3 |
| Ramp | Outgas (µg/g) | 18 | 9.2 | 6.7 | 4.2 | 3.1 | 4.3 | 4.8 | 5.8 |
|  | Polydimethylsiloxane (D4 to D10)(µg/g) | <0.001* | <0.001* | <0.001* | <0.001* | <0.001* | 0.02 | 0.09 | 0.24 |

*Detection limit

TABLE 1-2

|  |  | Comparative Example 1 | Comparative Example 2 | Comparative Example 3 | Comparative Example 4 | Comparative Example 5 |
|---|---|---|---|---|---|---|
| Composition (parts by weight) | Polyacetal resin A | 100 | 100 | 100 | 100 | 100 |
|  | Colorant B1 | — | — | 1 | 1 | 1 |
|  | Colorant B2 | — | — | — | — | — |
|  | Colorant B3 | — | — | — | — | — |
|  | Colorant B4 | — | — | — | — | — |
| Preparation conditions | Extruder | Single screw | Single screw | Single screw | Single screw | Single screw |
|  | Vent | None | Single | None | Single | None |
|  | Chloride ion concentration in cooling water (µg/g) | 50 | 50 | 50 | 150 | 150 |
|  | Suction removal of water adhering to strands | Not applied | Not Applied | Not Applied | Not Applied | Not Applied |
|  | Outgas from pellets (µg/g) | 55 | 30 | 70 | 60 | 85 |
|  | Chloride ion adhering to pellets (µg/g) | 0.6 | 0.6 | 0.7 | 1.3 | 1.3 |
| Ramp | Outgas (µg/g) | 28 | 15 | 30 | 25 | 35 |
|  | Polydimethylsiloxane (D4 to D10)(µg/g) | <0.001* | <0.001* | <0.001* | <0.001* | <0.001* |

*Detection limit

The results shown in Table 1 reveal the following advantages:

1) The method of the present invention makes it possible to suppress the outgas level of the ramp for a hard disk drive to an extremely low level of 20 µg/g or less.

2) The method of the present invention also makes it possible to suppress the amount of the harmful substance in the outgas to be at an extremely low level of 0.3 µg/g or less, by controlling the amount of the harmful substance contained in the colorant.

INDUSTRIAL APPLICABILITY

The ramp for a hard disk drive of the present invention makes it possible to noticeably reduce the outgas level and the amount of the harmful component in the outgas, and hence is effective in improving the reliability of hard disk drives getting increasingly larger in density.

In addition to application to hard disk drives, the polyoxymethylene resin material having a greatly reduced amount of outgas level and harmful component amount is also most suitable for applications to precision parts used under sealed conditions, taking advantage of the friction wear property of the resin material.

The invention claimed is:

1. A ramp for a hard disk drive having an outgas level of 20 µg/g or less, the ramp being produced by the steps:
   forming a polyoxymethylene resin pellet by melt-kneading a polyoxymethylene resin with a colorant using an extruder while degassing under a reduced pressure of −0.06 MPa or less from one or more vents of the extruder;
   injection molding the formed polyoxymethylene resin pellet;
   solvent washing the molded article; and
   drying the washed molded article,
   wherein the polyoxymethylene resin has a composition comprising a hindered phenol of 0.05 to 0.5% by weight, a formaldehyde reactive nitrogen-containing polymer of 0.01 to 0.5% by weight and a fatty acid salt of an alkaline earth metal of 0.01 to 0.5% by weight, relative to a polyoxymethylene copolymer,
   wherein the colorant is at least one member selected from the group consisting of titanium oxide, a composite metal oxide, iron oxide, carbon black, calcium carbonate, wollastonite and ultrafine particles of carbon, and
   wherein an amount of chloride ion adhering to a surface of a polyacetal resin obtained by the melt-kneading step is 1 µg/g or less.

2. The ramp for a hard disk drive according to claim 1, wherein the extruder is a twin screw extruder.

3. The ramp for a hard disk drive according to claim 1, wherein the amount of the chloride ion adhering to the surface of the resin is 0.5 µg/g or less.

4. The ramp for a hard disk drive according to claim 1, the ramp having an outgas level of 15 µg/g or less.

5. The ramp for a hard disk drive according to claim 1, the ramp having an outgas level of 10 µg/g or less.

6. The ramp for a hard disk drive according to claim 1, the ramp having an outgas level of 5 μg/g or less.

7. The ramp for a hard disk drive according to claim 1, the ramp being produced by using a colorant having a small content of a harmful component in the melt-kneading step and the ramp having the harmful component in an amount of 0.3 μg/g or less.

8. The ramp for a hard disk drive according to claim 7, the ramp having the harmful component in an amount of 0.1 μg/g or less.

9. The ramp for a hard disk drive according to claim 7, the ramp having the harmful component in an amount of 0.05 μg/g or less.

* * * * *